United States Patent
Kummer et al.

(10) Patent No.: US 9,351,023 B2
(45) Date of Patent: May 24, 2016

(54) OUTPUT OF BROADCAST CONTENT WITH PORTIONS SKIPPED

(71) Applicant: EchoStar Technologies, L.L.C., Englewood, CO (US)

(72) Inventors: David Kummer, Highlands Ranch, CO (US); Henry Gregg Martch, Parker, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/209,034

(22) Filed: Mar. 13, 2014

(65) Prior Publication Data

US 2014/0282795 A1    Sep. 18, 2014

Related U.S. Application Data

(60) Provisional application No. 61/790,246, filed on Mar. 15, 2013.

(51) Int. Cl.
| | |
|---|---|
| H04N 7/16 | (2011.01) |
| H04N 21/238 | (2011.01) |
| H04N 21/2387 | (2011.01) |
| H04N 21/6587 | (2011.01) |
| H04N 21/81 | (2011.01) |
| H04N 21/433 | (2011.01) |
| H04N 21/44 | (2011.01) |

(52) U.S. Cl.
CPC ......... *H04N 21/238* (2013.01); *H04N 21/2387* (2013.01); *H04N 21/4331* (2013.01); *H04N 21/44004* (2013.01); *H04N 21/6587* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 6,535,252 | B1* | 3/2003 | Bruls | 348/459 |
| 8,060,904 | B1* | 11/2011 | Evans et al. | 725/35 |
| 2003/0072556 | A1* | 4/2003 | Okujima et al. | 386/46 |
| 2004/0255321 | A1* | 12/2004 | Matz | 725/14 |
| 2005/0240962 | A1* | 10/2005 | Cooper et al. | 725/38 |
| 2007/0055980 | A1* | 3/2007 | Megeid et al. | 725/28 |
| 2008/0228868 | A1* | 9/2008 | Sivakoff | 709/203 |

* cited by examiner

*Primary Examiner* — Joshua Taylor
(74) *Attorney, Agent, or Firm* — Kilpatrick Townsend & Stockton LLP

(57) ABSTRACT

Various arrangements are described for skipping portions of content, such as commercials, from a broadcast television program. The programming content is presented at a reduced presentation rate with the broadcast content being buffered as received. The reduced presentation rate may be less than a broadcast rate at which the content was originally intended to be output for presentation. One or more undesired portions of content may be skipped due to the reduced presentation rate. Commercials may be tagged by a television service provider.

16 Claims, 6 Drawing Sheets

OUTPUT OF BROADCAST CONTENT WITH PORTIONS SKIPPED

CROSS REFERENCES TO RELATED APPLICATIONS

This application claims priority from co-pending U.S. Patent Application No. 61/790,246, entitled "Delivery of Content with Portions Skipped," filed on Mar. 15, 2013, the entire disclosure of which is incorporated by reference for all purposes.

BACKGROUND

The advent of the digital video recorder (DVR) and the availability of high-capacity computer-readable storage devices at reasonable prices have made available many possibilities to television programming service providers and television viewers alike. In recent years, television viewers have come to expect the ability to easily customize and manage the recording of television programming via their television receivers. Further, many television viewers would prefer not to watch television commercials, especially when such television commercials interrupt the content (e.g., television program, movie, etc.) that the television viewer is viewing.

SUMMARY

In some embodiments, a television receiver configured to output broadcast content for presentation with a segment of the broadcast content skipped is presented. The television receiver may include a tuner configured to receive the broadcast content from a television service provider. The television receiver may include a buffer configured to store at least a portion of the broadcast content, the broadcast content being created for presentation at a broadcast rate. The television receiver may include one or more processors. The television receiver may include a non-transitory computer-readable storage medium communicatively coupled with and readable by the one or more processors and having stored therein processor-readable instructions. When executed by the one or more processors, may cause the one or more processors to receive, via the tuner, the broadcast content, wherein the broadcast content comprises a first segment, a second segment, and a third segment. The instructions may cause the one or more processors to, as the broadcast content is received, store the broadcast content to the buffer such that at least the first segment and the third segment are stored. The instructions may cause the one or more processors to identify the second segment of the broadcast content as the segment to be skipped from being output. The instructions may cause the one or more processors to consecutively output, to a presentation device, the first segment and the third segment at a presentation rate, wherein the presentation rate is a slower rate than the broadcast rate.

Embodiments of such a television receiver may include one or more of the following features: The instructions may cause the one or more processors to calculate the presentation rate for outputting the first segment and the third segment. The processor-readable instructions that, when executed, cause the one or more processors to calculate the presentation rate for outputting the first segment and the third segment may be based on a scheduled time period of the broadcast content and an expected length of commercial breaks within the broadcast content. The processor-readable instructions may be further configured to cause the one or more processors to receive, via the tuner, the presentation rate from the television service provider. The broadcast content may include a television program having a commercial break, and the second segment comprises the commercial break. The instructions may cause the one or more processors to receive a pause command. The instructions may cause the one or more processors, following the pause command, receive a play command. The instructions may cause the one or more processors to, in response to the play command, calculate a second presentation rate for outputting the third segment. The second presentation rate may be greater than the presentation rate. The instructions may cause one or more processors to identify the second segment of the broadcast content as the segment to be skipped from being output are based on one or more tags received via the tuner from the television service provider.

In some embodiments, a method for outputting broadcast content for presentation with a segment of the broadcast content skipped is presented. The method may include receiving, by a television receiver, the broadcast content. The broadcast content may include a first segment, a second segment, and a third segment. The broadcast content may be created for presentation at a broadcast rate. The method may include, as the broadcast content is received, storing, by the television receiver, the broadcast content such that at least the first segment and the third segment are stored. The method may include identifying, by the television receiver, the second segment of the broadcast content as the segment to be skipped from being output. The method may include consecutively outputting, by the television receiver to a presentation device, the first segment and the third segment at a presentation rate, wherein the presentation rate is a slower rate than the broadcast rate.

Embodiments of a method may include one or more of the following: The method may include calculating the presentation rate for outputting the first segment and the third segment. Calculating the presentation rate for outputting the first segment and the third segment may be based on a scheduled time period of the broadcast content and an expected length of commercial breaks within the broadcast content. The method may include receiving, via a tuner by the television receiver, the presentation rate from a television service provider. The broadcast content may include a television program having a commercial break, and the second segment comprises the commercial break. The method may include receiving, by the television receiver, a pause command. The method may include following the pause command, receiving, by the television receiver, a play command. The method may include, in response to the play command, calculating, by the television receiver, a second presentation rate for outputting the third segment. The second presentation rate may be greater than the presentation rate. Identifying the second segment of the broadcast content as the segment to be skipped from being output may be based on one or more tags received via a tuner from a television service provider.

In some embodiments, a non-transitory processor-readable medium for outputting broadcast content for presentation with a segment of the broadcast content skipped is presented. The non-transitory processor-readable medium may include processor-readable instructions configured to cause one or more processors to receive, via a tuner, the broadcast content. The broadcast content may include a first segment, a second segment, and a third segment. The broadcast content may be created for presentation at a broadcast rate. The instructions may cause the one or more processors to, as the broadcast content is received, store the broadcast content to a buffer such that at least the first segment and the third segment are stored. The instructions may cause the one or more processors to identify the second segment of the broadcast content as the segment to be skipped from being output. The instructions may cause the one or more processors to consecutively output, to a presentation device, the first segment and the third segment at a presentation rate, wherein the presentation rate is a slower rate than the broadcast rate.

Embodiments of such a non-transitory computer-readable medium may include one or more of the following: The instructions may cause the one or more processors to calculate the presentation rate for outputting the first segment and the third segment. The processor-readable instructions configured to cause the one or more processors to calculate the presentation rate for outputting the first segment and the third segment may base calculation on a scheduled time period of the broadcast content and an expected length of commercial breaks within the broadcast content. The instructions may cause the one or more processors to receive, via the tuner, the presentation rate from a television service provider. The broadcast content may include a television program having a commercial break, and the second segment comprises the commercial break. The processor-readable instructions may be further configured to cause the one or more processors to: receive a pause command; following the pause command, receive a play command; and in response to the play command, calculate a second presentation rate for outputting the third segment, wherein the second presentation rate is greater than the presentation rate.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
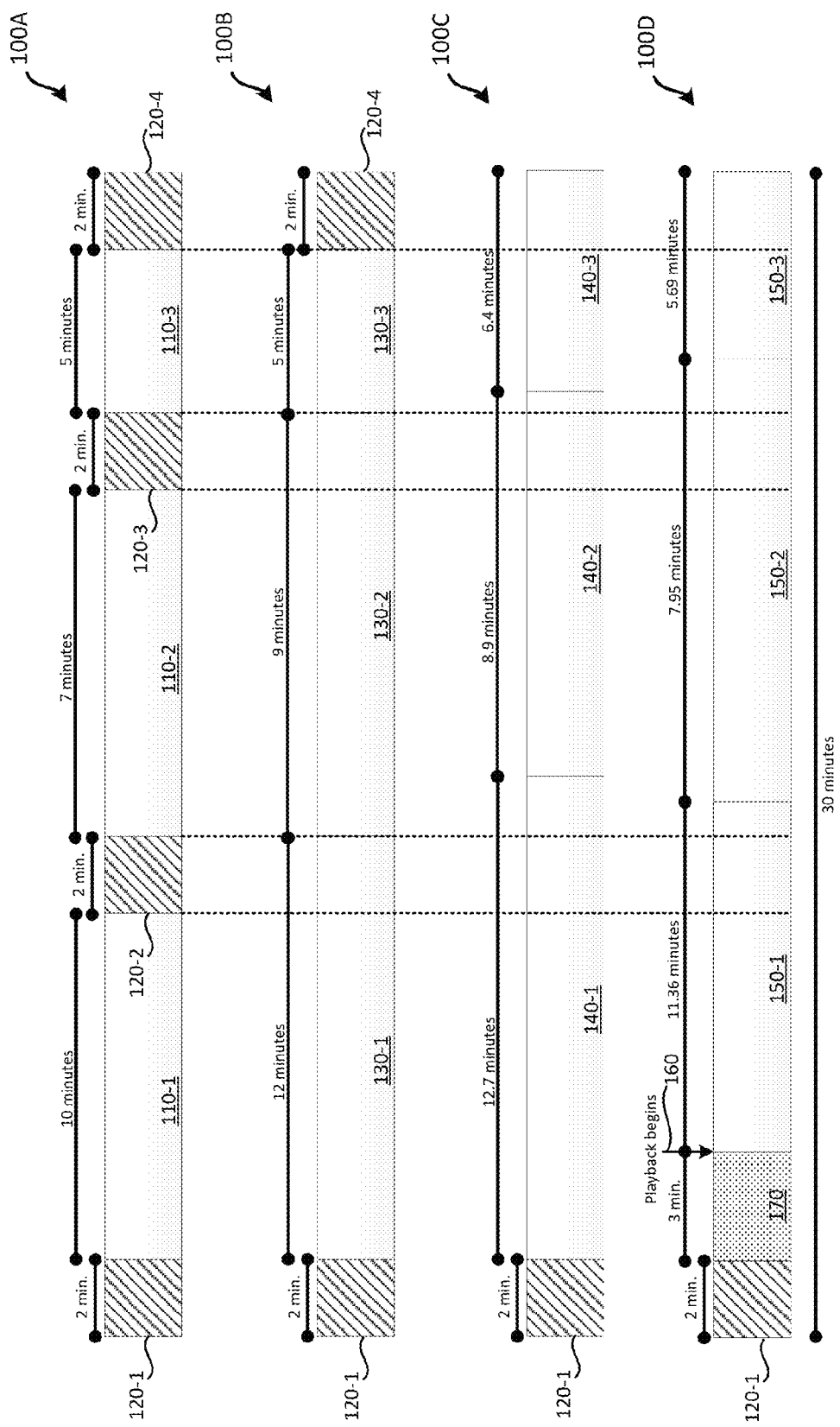
FIG. 1 illustrates multiple embodiments of broadcast content output for presentation.

Television viewers often want to view broadcast programming content without having to view commercials and/or other undesired portions of the broadcast content. For example, many one hour instances of broadcast content in the U.S. have programming content that occupies approximately 42 minutes of the broadcast content, and commercial content that occupies approximately 18 minutes of the broadcast content. Digital video recorders (DVRs) allow users to record television programs in a digital format for later playback, so that the viewer is able to perform time shifting functions, and thus skip or fast forward past commercial breaks. The user performs this function manually, e.g., using a fast forward button, but this is often inconvenient to the viewer. Also, it can be difficult for the viewer to accurately skip the portions of the program that the viewer does not want to watch.

A television service provider can provide a service to enable a user to record broadcast content at either a service provider system or a television receiver having DVR functionality. The television service provider may transmit metadata or other control information which accurately identifies the start and end of commercial content (e.g., each commercial or groups of commercials, which may be referred to as commercial breaks). The user may then later view the recorded program and skip commercials based on the control information. Such services, however, may require the viewer to delay the playback until the broadcast content has been recorded and the control information has been received by the television receiver, which typically requires the viewer to delay watching a program until after it was fully broadcast (e.g., an hour later, the next day). Accordingly, it may be desirable for a user to view the desired programming content while the broadcast content is being broadcast but with the commercial content skipped.

In some embodiments, broadcast content (which includes programming content, such as a television program, and commercial content, which is one or more commercials) is broadcast by a television service provider (e.g., via satellite, cable, over-the-air broadcast, or an IP-based network) and is buffered at a television receiver. The programming content of the broadcast content may be output for presentation at a presentation rate that is slower than the broadcast rate. As used herein, the "broadcast rate" is the rate at which the program content is broadcast by the service provider and was intended (e.g., at the time of creation) to be presented to a viewer. For example, the broadcast rate of video may be 30 frames per second (fps). By outputting content at a presentation rate that is lower than the broadcast rate, an amount of buffered content will increase as the broadcast progresses. When an undesired portion of the broadcast content is broadcast, such as commercial content (which may include one or more commercials), buffered programming content may continue to be presented while the commercial content is broadcast and received (but not presented). The commercial content may be skipped from output from the buffer (or not buffered at all). By the time the broadcast of the commercial content has ceased and broadcast of programming content has resumed, most or all of the buffered programming content may have been output for presentation at the lower presentation rate. Once broadcast of the commercial content is complete, programming content being broadcast is buffered as received at the broadcast rate, while presentation continues at the reduced presentation rate. Therefore, rather than outputting all of the broadcast content, the programming content of the broadcast content is output for presentation at a lower rate (e.g., 25 fps), thereby allowing a television viewer to watch a television program (the programming content), while it is being broadcast, without commercials (the commercial content).

As one example, the presentation rate may be calculated (at least initially) based on the relative amount of commercial time to the entire broadcast time. Control information that indicates the presentation rate may be transmitted to the television receiver by the television service provider. In described embodiments, the control information may be provided to the user equipment prior to or during broadcast of the broadcast content. The control information identifies the presentation rate. Tags may also be broadcast that identify portions of the broadcast content (e.g., commercials, violent scenes, profane scenes) to be skipped. The television receiver may detect the tags and cause the commercials to be removed or skipped from the buffered broadcast program content. Alternatively, the commercials may not be buffered. In some embodiments, the presentation rate may be dynamically adjusted during playback of the programming content. For example, user initiated pauses at the user equipment may allow for more programming content to be buffered, thus allowing a recalculation of the presentation rate (e.g., in order to increase the initial presentment rate, thus making the presentation rate closer to the broadcast rate). Such an increase in rate is possible when additional amounts of programming content have been buffered. As another example, a comparison of the actual time of commercial breaks to estimated commercial breaks may be monitored during delivery of the broadcast program and then used to adjust the presentation rate.

While the embodiments detailed herein are focused on the skipping of commercials within broadcast content, it should be understood that the same principles may be applied for other types of content. For instance, violent, obscene, or other adult-only material may be skipped from broadcast presentation. In addition, in embodiments where commercials are being skipped, the user may select skipping of certain types or categories of commercial but not others. For example, a user (e.g., via a user interface) could select all commercials to be skipped except commercials relating to certain products that the user has an interest in, such as sports equipment or movie trailers. Other selections by the user, either in advance, or based on real time feedback for commercials as they are being viewed, are possible. Further, embodiments detailed herein may be applied to non-video programming (such as radio broadcasts and other forms of streaming or broadcast media).

FIG. 1 illustrates multiple embodiments of playback of broadcast content. Embodiment 100A represents thirty minutes of broadcast content. Embodiment 100A represents the form in which content is broadcast and can be output for presentation to a television viewer at a broadcast rate without commercial content skipping. The broadcast content of embodiment 100A may include a television program scheduled for thirty minutes, such as a sitcom, that includes commercial breaks. To be clear, broadcast content includes both commercial content segments 120 and programming content segments 110. A television viewer is typically interested in watching programming content segments 110 but would prefer to skip commercial content segments 120. In the exemplary embodiments of FIG. 1, the broadcast content of embodiment 100A starts with a two minute segment of commercial content segment 120-1 followed by a ten minute programming content segment 110-1. A second commercial break, commercial content segment 120-2, follows for two minutes, followed by a seven minute segment of programming content segment 110-2. A third segment of commercial content 120-3 follows for another two minutes. Programming content segment 110-3 then follows with a five minute segment. A final two minute segment of commercial content segment 120-4 may then be broadcast.

Broadcast content for embodiment 100A, as broadcast by a television service provider, involves broadcast of each of these segments consecutively as listed, at a broadcast rate (e.g., 30 fps). If a television viewer watches the broadcast content live, the television viewer would view both the commercial content segments 120 and programming content segments 110. Embodiments 100B, 100C, and 100D represent exemplary embodiments for buffering and playing back the programming content at different presentation rates such that at least some of the commercial content 120 of embodiment 100A can be skipped. It should be understood that the number, time of occurrence, and length of commercial content segments in embodiment 100A may vary in other embodiments; similarly, the number, time of occurrence, and length of programming content segments may vary in other embodiments.

Embodiment 100B represents playback of embodiment 100A at a slower presentation rate such that at least some commercial content is skipped from being output during playback. Output to a presentation device of content in embodiment 100B begins substantially at the time when the broadcast content is received (as such, the broadcast content is not first fully recorded). Rather, for example, if the broadcast content is scheduled from 8-8:30 PM, output for presentation in embodiment 100B begins at substantially 8 PM. In embodiment 100B, commercial content segment 120-1 may be output for presentation by a television receiver. Commercial content segment 120-1 may be output for presentation because no (or insufficient) programming content has yet been buffered. Commercial content segment 120-1 may be output at the broadcast rate or at a slower presentation rate. If at a slower presentation rate, content, as received at the broadcast rate, is buffered. As programming content segment 110-1 is broadcast and received by the television receiver at the broadcast rate, programming content segment 110-1 is buffered and output at a lower presentation rate such that playback takes, for example, 12 minutes at the presentation rate (as opposed to 10 minutes at the broadcast rate). Therefore, programming content segment 130-1 represents programming content segment 110-1 at about an 83% presentation rate (as compared to the broadcast rate).

Commercial content segment 120-2, when received by the television receiver, may be indicated as such by metadata, such as tags, that indicate either the commercial break or individual commercials within commercial content segment 120-2. Commercial content segment 120-2 may not be buffered in embodiment 100B or may be buffered by the television receiver but not output for presentation. While commercial content segment 120-2 is being received by the television receiver, programming content segment 130-1 is still being output for presentation at the slower presentation rate.

Programming content segment 110-2 may be received, buffered and output at a lower presentation rate than the broadcast rate as programming content segment 130-2. As programming content segment 110-2 is broadcast and received by the television receiver at the broadcast rate, programming content segment 110-2 is buffered and output at a lower presentation rate such that playback takes, for example, 9 minutes at the presentation rate as opposed to 7 minutes at the broadcast rate. Therefore programming content segment 130-2 represents programming content segment 110-2 at about a 77% presentation rate (as compared to the broadcast rate). Since programming content segment 130-1 was output at a slower rate, programming content segment 130-2 is presented immediately following programming content segment 130-1 such that no commercial content or other content is presented between the two segments of programming content.

Commercial content segment 120-3, when received by the television receiver, may be indicated as such by metadata, similar to commercial content segment 120-2. Commercial content segment 120-3 may not be buffered in embodiment 100B or may be buffered by the television receiver but not output for presentation. While commercial content segment 120-3 is being received by the television receiver, programming content segment 130-2 is still being output for presentation at the slower presentation rate.

Since programming content segment 130-2 was output at a slower rate, programming content segment 130-3 is presented immediately following programming content segment 130-2 such that no commercial content or other content is presented between the two segments of programming content 130-2 and 130-3. Programming content segment 130-3 may be presented at the broadcast rate. In such embodiments, programming content segments 130-1, 130-2, and 130-3 are presented consecutively. In some embodiments, rather than presenting programming content segment 130-3 at the broadcast rate, it may be presented at a slower presentation rate such that commercial content segment 120-4 can be skipped. The presentation rate may vary by programming content segment; for example, programming content segment 130-1 may be presented at a different presentation rate than programming content segment 130-2. The presentation rate may be made as similar to the broadcast rate as possible while allowing for enough buffering such that commercial content can be skipped from being output for presentation and have segments of programming content presented consecutively.

Embodiment 100C represents output of content of embodiment 100A at a slower presentation rate such that at least some commercial content is skipped from playback. While various segments of programming content were output at different presentation rates in embodiment 100B, in embodiment 100C, a constant presentation rate is used throughout playback. Output to a presentation device of content in embodiment 100C begins substantially at the time when the broadcast content is received (as such, the broadcast content is not first fully recorded). Rather, for example, if the broadcast content is scheduled from 8-8:30 PM, output for presentation in embodiment 100C begins substantially at 8 PM. In embodiment 100C, commercial content segment 120-1 may be output for presentation by a television receiver. Commercial content segment 120-1 may be output for presentation because no (or insufficient) programming content has yet been buffered. Commercial content segment 120-1 may be output at the broadcast rate or at a slower presentation rate. If at a slower presentation rate, content, as received at the broadcast rate, is buffered. As programming content segment 110-1 is broadcast and received by the television receiver at the broadcast rate, programming content segment 110-1 is buffered and output at a lower presentation rate as programming content segment 140-1 such that playback takes, for example, 12.7 minutes at the presentation rate as opposed to 10 minutes at the broadcast rate. Therefore programming content segment 140-1 represents programming content segment 110-1 at about a 78% presentation rate (as compared to the broadcast rate). This presentation rate may be calculated based on historical information about how long commercial breaks last. For instance, following commercial content segment 120-1, it may be known that 22 of the remaining 28 minutes is programming content, therefore a 78.5% presentation rate (as compared to broadcast rate) can be used while allowing commercials to be skipped.

Commercial content segment 120-2, when received by the television receiver, may be indicated as such by metadata, such as tags, that indicate either the commercial break or individual commercials within commercial content segment 120-2. Commercial content segment 120-2 may not be buffered in embodiment 100C or may be buffered by the television receiver but not output for presentation. While commercial content segment 120-2 is being received by the television receiver, programming content segment 130-1 is still being output for presentation at the presentation rate.

Programming content segment 110-2 may be received (possibly while programming content segment 140-1 is still being output for presentation), buffered and output at the same lower presentation rate as programming content segment 140-1. As programming content segment 110-2 is broadcast and received by the television receiver at the broadcast rate, programming content segment 110-2 is buffered and output such that playback takes, for example, 8.9 minutes at the presentation rate as opposed to 7 minutes at the broadcast rate. Therefore, programming content segment 140-2 represents programming content segment 110-2 at about a 78.5% presentation rate (as compared to the broadcast rate). Since programming content segment 140-1 was output at a slower rate, programming content segment 140-2 is presented immediately following programming content segment 140-1 such that no commercial content or other content is presented between the two segments of programming content.

Since programming content segment 140-2 was played at the presentation rate, programming content segment 140-3 is presented immediately following programming content segment 140-2 such that no commercial content or other content is presented between the two segments of programming content. In the illustrated embodiment 100C, commercial content segment 120-4 is skipped by presenting content at the slower presentation rate. A higher presentation rate could be used in other embodiments if this last segment of commercial content was not skipped. (For instance, a television viewer may not mind having commercials presented before and after the programming content, but may mind commercial content during the programming content.)

Programming content segment 140-3 may be output for presentation at the same presentation rate as programming content segments 140-1 and 140-2. In such embodiments, programming content segments 140-1, 140-2, and 140-3 are presented consecutively.

In embodiment 100D, rather than output for presentation beginning immediately, the broadcast content may have begun to be recorded. While the broadcast content is still being broadcast, output for presentation may begin (e.g., in response to a user requesting playback). For example, embodiment 100D is based on a situation where broadcast content is scheduled for broadcast from 8-8:30 PM. Recording may begin at 8 PM and the user may request output for presentation at 8:05 PM. As such playback begins at time 160, recorded programming content 170 of programming content segment 110-1 has already been recorded.

When playback is requested, a presentation rate may be calculated by the television receiver based on the expected amount of commercial content remaining in the broadcast content to be received, the amount of programming content expected to be received, the amount of remaining broadcast content, and/or the amount of programming content already recorded. The more programming content that has been recorded and/or the less commercial content remaining, the closer the presentation rate can be made to the broadcast rate. In embodiment 100D, for example, based on historical broadcasts, it is expected that 6 minutes of commercial content are yet to be broadcast and 19 minutes of programming content are yet to be broadcast. Based on these numbers, a presentation rate can be calculated. In the 25 minutes after time 160, 22 minutes of programming content are available for playback. Therefore, the presentation rate could be 88% of the broadcast rate (22 minutes/25 minutes).

Similarly as detailed in relation to embodiments 100B and 100C, programming content segments 110-1, 110-2, and 110-3 may be presented at the slower presentation rate as programming content segment 150-1, 150-2, and 150-3, respectively. Such presentation content includes recorded programming content 170. Programming content segments 150-1, 150-2, and 150-3 are presented consecutively such that no commercial content is presented between segments of programming content. In some embodiments, commercial content segment 120-4 may not be skipped. If such content is not skipped, programming content segments 150-1, 150-2, and 150-3 may still be presented consecutively and may also be presented at a presentation rate closer to the broadcast rate, such as 95.7% of the broadcast rate (that is, 22 minutes of content, including recorded programming content 170, in a 23 minute window ending at the start of commercial content segment 120-4).

Figure 2:
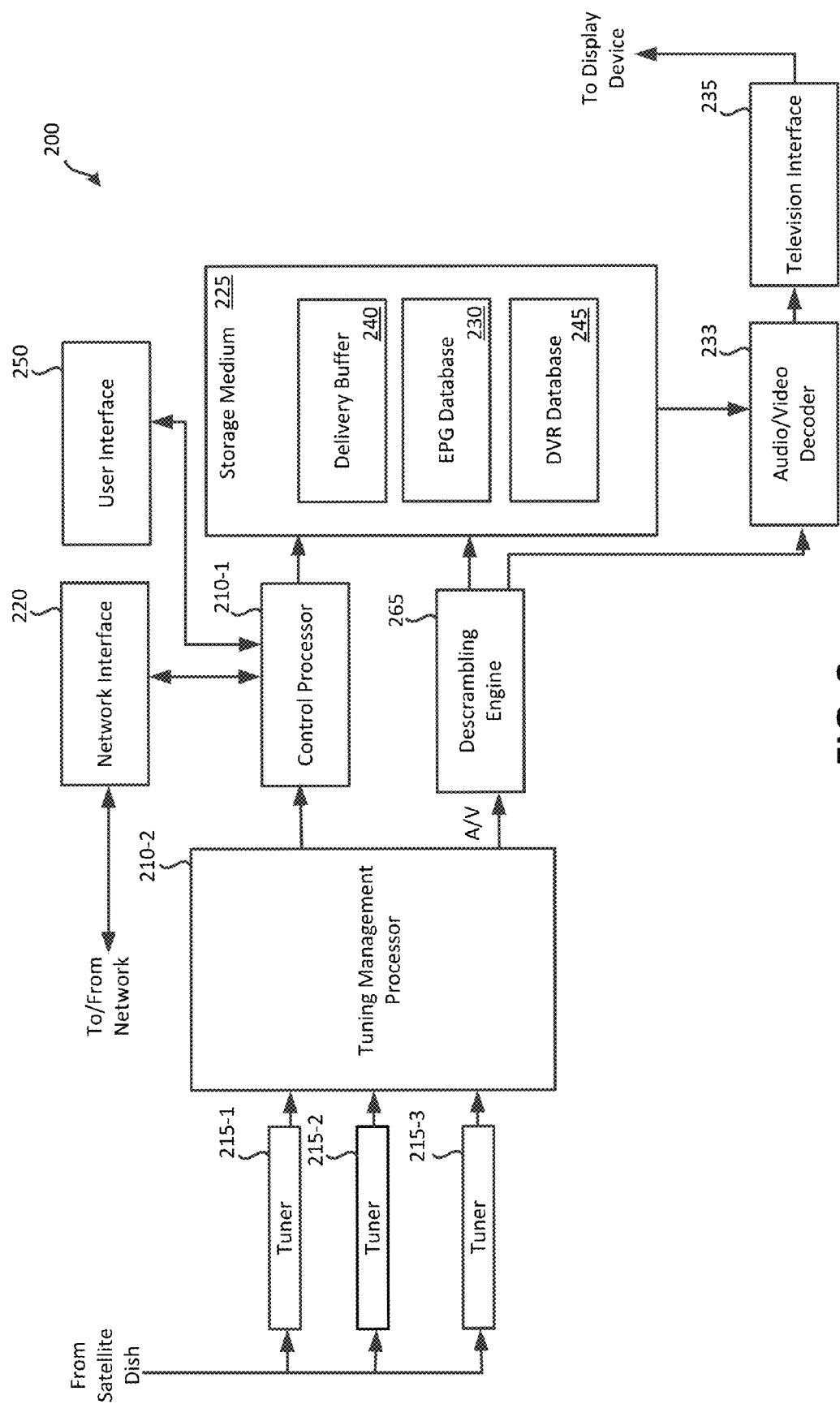
FIG. 2 illustrates an embodiment of a television receiver.

FIG. 2 illustrates a block diagram of an embodiment of a television receiver 200. Television receiver 200 may be in the form of a separate device, such as a set top box (STB), configured to be connected with a display device. Alternatively, television receiver 200 may be incorporated into another device, such as a display device. Television receiver 200 may include: processors 210, tuners 215, network interface 220, storage medium 225 (which may include multiple different types of storage devices), audio/video decoder 233, television interface 235, user interface 250, and/or descrambling engine 265.

Processors 210 may include one or more general-purpose processors configured to perform processes such as tuning to a particular channel, displaying an electronic programming guide (EPG), and/or receiving and processing input from a user or control information from a television service provider system (which is broadcasting multiple television channels). Processors 210 may include one or more special purpose processors. For example, processors 210 may include one or more processors dedicated to decoding video signals from a particular format, such as MPEG, for output and display on a television and for performing decryption.

Tuners 215 may include one or more tuners used to tune to television channels, such as television channels transmitted via satellite, cable, or over-the-air broadcasts. Each tuner contained in tuners 215 may be capable of receiving and processing a stream of data in a satellite transponder stream (or a cable RF channel). As illustrated in FIG. 2, tuners 215 are connected to a satellite dish for receiving satellite signals from a television service provider; it should be understood that in other embodiments, a cable network or packet-based network may also be used.

Network interface 220 may be used to communicate via an alternate communication channel with a remote television service provider system, such as via the Internet (and, possibly, a wired or wireless network). For example, while the primary communication channel may be one or more of the satellites (which may be unidirectional to the television receiver 200), an alternate communication channel (which may be bidirectional) may be via a network and network interface 220.

Storage medium 225 may represent database or memory systems having computer-readable storage medium. Storage medium 225 may include memory and/or a hard drive. Storage medium 225 may be used to store information received from one or more satellites and/or information received via network interface 220. Storage medium 225 may store information related to an electronic programming guide (EPG) in an EPG database 230, and/or recorded television programs (and related control information) in a DVR database 245. While not illustrated, the storage medium 225 may also include separate memory for storing data and instructions (other than those relating to the illustrated EPG or DVR functions) for use in various processes carried out by the television receiver 200. As should be apparent, and as a result of the processing and various storage functions illustrated (such as DVR database 245), the television receiver 200 may perform, among other things, functions commonly thought of as being those associated with a discrete digital video recorder (DVR) device.

EPG database 230 may store information related to television channels and the timing of programs appearing on such television channels. EPG database 230 may be used to inform users of what television channels or programs are available and/or provide recommendations to the user. EPG database 230 may provide the user with a visual interface displayed by a display device that allows the user to browse and select television channels and/or television programs for viewing at a display device and/or recording via DVR database 245. In one embodiment, the visual interface may allow a user to select television programs for which commercials are to be automatically skipped. Information used to populate EPG database 230 may be received via network interface 220 and/or via satellites, via tuners 215. For instance, updates to EPG database 230 may be received periodically via satellite. EPG database 230 may be used to determine how long a scheduled piece of broadcast content is expected to be broadcast.

Delivery buffer 240 can temporarily store broadcast television programming received through tuners 215. Delivery buffer 240 can buffer broadcast content (or, in some embodiments, programming content without commercial content) in order to permit commercial content to be removed from the programming as it is delivered in near real time (but generally at a slower rate) to a user through an audio/video decoder 233 and television interface 235. In some embodiments, delivery buffer 240 is implemented using solid state memory, while DVR database 245 is stored using a hard drive. In some embodiments, the same storage device or same type of storage device is used. Delivery buffer 240, or some other storage arrangement, may also be configured to store an indication of the presentation rate. Control processor 210-1 may calculate the presentation rate or may be notified of the presentation rate by the television service provider. Control processor 210-1 may adjust the output of television interface 235 such that content is output at the presentation rate.

Audio/video decoder 233 may serve to decode encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video and audio into a format appropriate to be displayed by a television or other form of display device and audio into a format appropriate to be output from speakers, respectively.

Television interface 235 may serve to output a signal to a display device (or another form of display device) in a proper format for displaying of video and for playing audio to the user/viewer. As such, television interface 235 may output one or more television channels and may output stored television programming from storage medium 225 (e.g., from delivery buffer 240, from DVR database 245 and/or information from EPG database 230) to a television, or some other form of display device, for presentation.

Digital video recorder (DVR) database 245 may permit a television channel to be recorded for a period of time. DVR database 245 may store timers that are used by processors 210 to determine when a television channel should be automatically tuned to and recorded to DVR database 245 of storage medium 225. Timers may be set by the television service provider and/or one or more users of the television receiver 200. DVR database 245 may be configured by a user to record particular television programs, for later playback at the convenience of the user. For instance, referring to FIG. 1, the stored television programming 170 of embodiment 100D may have been based on a timer. Such a timer may be user-configured or may be received from a television service provider (e.g., via tuners 215 or via network interface 220).

User interface 250 may include a remote control (physically separate from television receiver 200) and/or one or more buttons on television receiver 200 that allow a user to interact with television receiver 200. Among other things, a user interface 250 may be used to select for viewing a television channel as it is broadcast, for viewing a channel that has been buffered at delivery buffer 240 (that is presented in near real time with commercials skipped), for viewing data in EPG database 230, and/or for viewing programs recorded at DVR database 245.

Descrambling engine 265 is used to descramble video and/or audio corresponding to television channels for storage and/or presentation. Video and/or audio data contained in the transponder data streams (or other form of data stream) received by tuners 215 may be scrambled by the television service provider. The video and/or audio may be descrambled by descrambling engine 265, using a scramble control identifier present within the data packet containing the scrambled video or audio, in conjunction with encryption keys/control words stored at the television receiver 200. Descrambled video and/or audio may be output by descrambling engine 265 to storage medium 225 for storage (at delivery buffer 240 or at DVR database 245) and/or to audio/video decoder 233 for output to a display device or other presentation equipment via television interface 235.

For ease of description, television receiver 200 of FIG. 2 has been reduced to a block diagram, and some parts not necessary for understanding the invention have been omitted. In other embodiments of television receiver 200, fewer or greater numbers of components may be present, and various illustrated modules of television receiver 200 may be combined into a fewer number of modules or divided into a greater number of modules. A more complete description of many of the components in television receiver 200 can be found, e.g., in co-pending and commonly assigned U.S. application Ser. No. 13/793,636, entitled TRANSFER OF TELEVISION PROGRAMS FROM CHANNEL SPECIFIC FILES TO PROGRAM SPECIFIC FILES, by Mark Templeman et al., filed on Mar. 11, 2013, which application is hereby incorporated by reference. Also, it should be understood that the various components of television receiver 200 may be implemented using hardware, firmware, software, and/or some combination thereof. For example, functions of EPG database 230, delivery buffer 240, and DVR database 245 may have their functions performed using, in part, instructions or processes executed by one or more of the processors 210. Further, some routing between the various modules of television receiver 200 has been illustrated. Such illustrations are for exemplary purposes only. Two modules not being directly or indirectly connected do not indicate the modules cannot communicate. Rather, connections between modules of the television receiver 200 are intended only to indicate possible common data routing.

Figure 3:
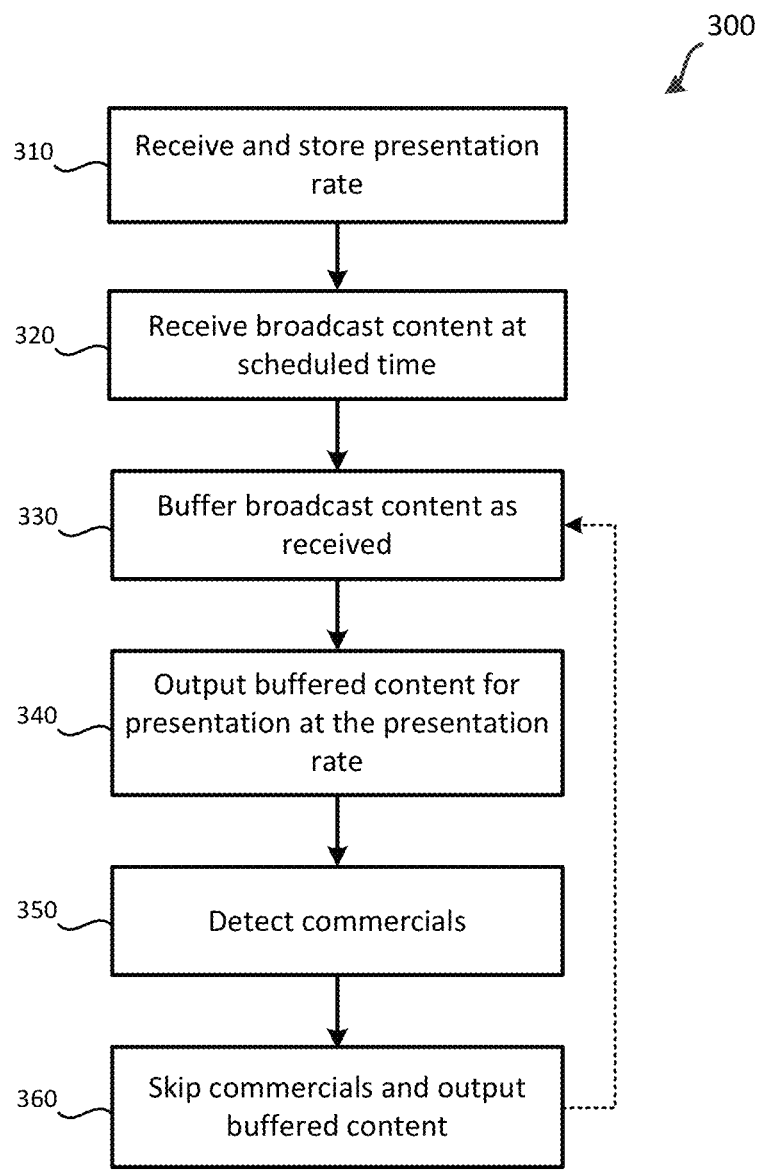
FIG. 3 illustrates an embodiment of a method for skipping portions of delivered content.

Various methods can be performed using the system of FIG. 2. FIG. 3 illustrates an embodiment of a method 300 for skipping portions of received broadcast content. Each step of method 300 may be performed by a television receiver, such as television receiver 200 of FIG. 2. Further, television receiver 200 may be computerized. As such, one or more components of computer system 600 of FIG. 6 may be used in performing method 300. In method 300, the user desires the programming content to be presented during a time period overlapping the time period during which the broadcast content is received from the television service provider. For example, referring to FIG. 1, embodiment 100A represents the broadcast content being received. During this period of time, the television viewer desires to see the programming content with commercial content removed. Presentation of the content may end at substantially the same time as when the broadcast content ends being broadcast. For example, if a television show is broadcast (with commercials from 8-8:30 PM), a user may desire to watch the show without commercials from 8-8:30 PM.

At step 310, a presentation rate may be received and stored by the television receiver. This presentation rate may be slower than the broadcast rate. The presentation rate may involve a fewer number of frames being output for presentation per second. Audio may be adjusted according to the presentation rate also. Audio may be normalized such that the pitch of audio is substantially unaffected although it may be being played at a slower rate. The presentation rate may be calculated by the television service provider. Based upon historical information on television programs or information received from the content provider (e.g., the television channel on which the broadcast content is carried), the television service provider that is broadcasting the content may be able to determine a presentation rate that will allow for the commercial content to be skipped. Such a presentation rate may be provided prior to the broadcast content being broadcast. In some embodiments, the presentation rate may be modified during broadcast of the broadcast content.

In some embodiments, rather than receiving the presentation rate, the presentation rate may be calculated by the television receiver. The presentation rate may be calculated based on an expected amount of programming content (as compared to an expected amount of commercial content) within a scheduled time period of the broadcast content. For example, equation 1 may be used to determine the presentation rate:

$$\text{Presentation Rate} = \frac{\text{Time(Programming Content)}}{\text{Time(Broadcast Content)}} \quad \text{Eq. 1}$$

By dividing the total amount of time of the programming content within the broadcast content by the total amount of time of the broadcast content, a presentation rate, which is a percentage of the broadcast rate, can be obtained. This rate can be used to present programming content while skipping commercial content. For instance, if there are 9 minutes of programming content in a 10 minute segment of broadcast content, the presentation rate would be 90% of the broadcast rate such that the 1 minute of commercial content could be skipped. Such a formula assumes that the commercial content to be skipped appears at the end of the broadcast content. The presentation rate would need to be adjusted if the commercial content appears earlier than at the end of the broadcast content. Of course, if the commercial content appears at the beginning of the broadcast content, such as in embodiment 100B of FIG. 1, it may not be skipped because no programming content has yet been buffered.

The presentation rate, whether calculated by the television receiver or by the television service provider, may be based upon a standard model associated with a broadcast time period. For instance, for all 30 minute television programs (or for all 30 minute programs on a particular television channel), it may be assumed that 8 minutes of commercial content is present; for 60 minute television programs, 17 minutes of commercial content may be present. Such a model may also factor in where within the broadcast content the commercial content is positioned. The presentation rate may also be calculated based on previous episodes of the same television program. For instance, a second piece of broadcast content may be expected to have the same amount of commercial content as a first piece of broadcast content that corresponds to an earlier episode of the same television program.

At step 320, the broadcast content may be broadcast and received by the television receiver at the scheduled time. For example, for a 30 minute television program, the scheduled time may be from 8 to 8:30 PM, including one or more commercials and/or one or more commercial breaks.

At step 330, all or some portions of the broadcast content may be buffered by the television receiver, such as by using delivery buffer 240 of FIG. 2. Broadcast content may be buffered to such a delivery buffer at the broadcast rate. This broadcast rate may reflect the rate at which the content was intended to be presented by the content provider. In some embodiments, all of the broadcast content received at the scheduled time may be buffered. In other embodiments, only the programming content within the broadcast content may be buffered.

At step 340, programming content that has been buffered may be output at the presentation rate received or calculated at step 310. As such, a television viewer may view programming content that was buffered at step 330 at a slower rate than the broadcast rate. While the broadcast content being broadcast is programming content, it can be expected that the amount of broadcast content in the buffer will increase because the broadcast rate is faster than the presentation rate. At least initially, it can be expected that programming content is output in near real time. As time passes and more programming content is received, due to the difference between the presentation rate and the broadcast rate, the amount of programming content buffered increases. It should be understood that the broadcast content is being received via a tuner during a same time period when broadcast content is being buffered and output at the presentation rate for viewing by a television viewer.

At step 350, commercial content may be detected. In some embodiments, broadcast content is buffered, which would include the buffering of commercial content. In such embodiments, the commercial content may be detected, based on tags that indicate the start and end of commercial breaks and/or individual commercials of the commercial content. In some embodiments, rather than buffering all of the broadcast content, only programming content is buffered. Using such tags, commercial content may be excluded from being buffered at step 330. Tags may be in the form of metadata received with the broadcast content by the television receiver via a tuner. In some embodiments, while a tuner may receive the broadcast content, a network interface may be used to retrieve tags from the television service provider.

At step 360, commercial content is skipped. While commercial content is being broadcast and received by the television receiver, rather than outputting the commercial content for presentation, the programming content that has been buffered but has not yet been output, which may be due to the decreased presentation rate, may be output for presentation. Therefore, a television viewer can be viewing programming content while commercial content is being broadcast and received. While the buffered broadcast content is being output from the buffer, the broadcast content, as broadcast, may again include programming content. Such programming content is buffered and output at a reduced presentation rate, such as detailed in relation to embodiments 100B and 100C of FIG. 1, thus allowing segments of presentation content to be output consecutively without any intervening commercial content. If the buffered programming content in the buffer is exhausted while the broadcast content being received is commercial content, the commercial content may be output for presentation at the broadcast rate.

The process of method 300 may be repeated as necessary such that multiple instances of commercial content within a piece of broadcast content is skipped. The presentation rate may be varied during output of the programming content based on a ratio of programming content to commercial content. For instance, referring to FIG. 1, in embodiment 100B, the presentation rate used for programming content segment 130-1 varies from the presentation rate used for programming content segment 130-2 due to a variance in ratio between the programming content and the commercial content. In some embodiments, such as embodiment 100C, a single presentation rate may be calculated that is used for all segments of programming content from within a piece of broadcast content.

Figure 4:
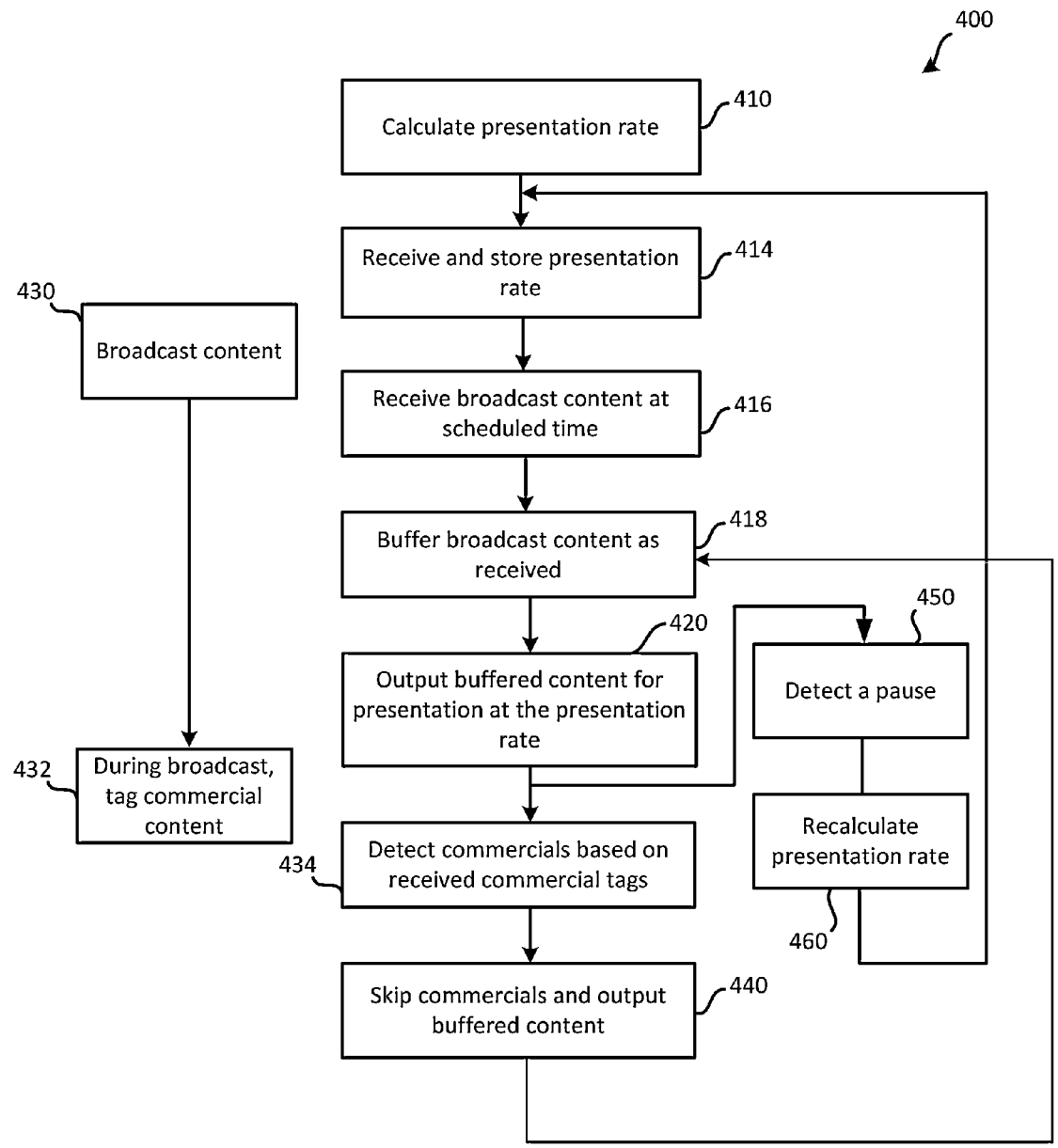
FIG. 4 illustrates an embodiment of a method for skipping portions of delivered content in which a pause command may be received during playback.

FIG. 4 illustrates an embodiment of a method 400 for skipping portions of delivered content in which a pause command may be received during playback. Generally, in this embodiment a television service provider supplements its various television distribution services by providing television programming for a user to view in near real time, but having commercials automatically skipped as the television programming is being viewed. The process is implemented by having the presentation rate for television programming slowed. The presentation rate is the rate at which the television programming is presented or delivered for viewing by the user. In conventional viewing, the presentation rate would essentially be the same as the broadcast rate (the rate at which programming is provided by the content provider and intended to be viewed by the user, and as normally delivered by the service provider to the viewer). In embodiments herein, the data representing the programming content is buffered and the presentation rate for the programming content is slowed in relation to the broadcast rate.

Steps of method 400 may be performed by a television receiver, such as television receiver 200 of FIG. 2. Further, television receiver 200 may be computerized. As such, one or more components of computer system 600 of FIG. 6 may be used in performing method 300. In method 400, the user desires the programming content to be presented during a time period overlapping the time period during which the broadcast content is received from the television service provider. For example, referring to FIG. 1, embodiment 100A represents the broadcast content being received. During this period of time, the television viewer desires to see the programming content with commercial content removed. Presentation of the content may end at substantially the same time as when the broadcast content ends being broadcast.

At step 410, television programming content may be analyzed by the television service provider system in advance of the scheduled broadcast in order to establish or calculate a presentation rate for any television programming which a viewer has selected or may select for viewing without commercials. The calculated presentation rate may be based (at least initially) on the estimated commercial time relative to the total time of the broadcast program. For example, since most one hour television programs have about 18 minutes of commercial breaks, the presentation rate established for any one hour program at step 410 could be the intended broadcast rate that is reduced or slowed by 30% (based on the ratio of 18 minutes of commercials to 60 minutes of total program time similarly discussed in relation to equation 1). Other factors could also be used to establish the presentation rate, for example, taking into account segments of the viewed program providing program previews, program introductions, and program promotions (interspersed within the program). It should also be appreciated that the presentation rate could be based additionally on the nature of the content itself. For example, scenes in programs may be analyzed using a television service provider system in near real time to determine whether such scenes could be slowed or speeded up, to make the content presentation rate more palatable (and less noticeable) to the viewer. As a further example, certain types of content (such as credits, weather or stock ticker information) in a program could be presented at slower rate than other types of content, to make the overall presentation more palatable to the viewer. As previously detailed, rather than the presentation rate being calculated by the television service provider, the presentation rate could be calculated by the television receiver.

At step 414, the presentation rate for the selected program may be sent in the form of control data from a television service provider system and is received and stored at the television receiver 200 (e.g., at storage medium 225). In some embodiments the control data representing the presentation rate is calculated or established at the television service provider system and sent to the television receiver. While the presentation rate data could be sent to television receiver 200 well in advance of the normal, real-time broadcast of a program (based on reasonable assumptions regarding commercial time and calculations using those assumptions), the initial presentation rate could be established in real time just ahead of the normal broadcast time, using the latest data available to the service provider, and sent to the television receiver at or immediately before the beginning of the broadcast.

At step 416, the broadcast content containing the television program is broadcast, such as over a satellite, over-the-air broadcast, or cable television service provider system, and received by the television receiver 200 over the scheduled broadcast time period. At step 418, the programming content or the broadcast content is buffered at delivery buffer 240 as it is received. At step 420, the programming content stored at delivery buffer 240 is then output from the buffer via decoder 232 and television interface 235 for presentation to the user, e.g., at a display device. Under the control of processors 210, the content from the delivery buffer 240 is delivered to the user at the slowed presentation rate established at step 310.

At about the same time as the television programming is being received by television receiver 200, buffered and output for presentation to the user (steps 416, 418 and 420), a television service provider system will tag commercial content as it appears in the programming at step 432. In one embodiment, human interaction at the service provider may be used to mark or tag the start and end of each commercial or commercial break, although other known methods of marking commercials and other content could be used. If the tagging of commercials at step 432 is performed, at least in part, with human interaction at the television service provider system, the presentation rate may be established at step 410 (taking into account the buffering at delivery buffer 240 and inherent buffering at other components within the television receiver 200) to provide the small amount of time needed for the human interaction to tag commercials before they are delivered to the user.

At step 432, the tags for the commercial content are sent and received at the television receiver 200. Since the system is designed to provide near real-time delivery of content, in many cases, the viewing of at least the beginning of a television program by a user may have already begun when some of the tags are received.

The television receiver may detect metadata tags at step 434 as the programming is readied for delivery from delivery buffer 240 to the user through audio/video decoder 233 and television interface 235.

In one embodiment, tags may identify closed captioning data sent over the satellite system along with the programming content as part of vertical blanking information (VBI). The tags may be used by a television receiver to locate a string of characters present in the closed captioning data to select frames at which skipping should begin and end. In other embodiments, the tags (identifying the program and the particular frames where groups of commercials start and end) may be received separately from the program content (e.g., sent over a network, such as the Internet) and are stored in storage medium 225 apart from the content. In either case, and at step 440, one or more of the processors 210 access the tags identifying the start and end of commercials and cause the data representing frames of the tagged commercial to be deleted, removed, or otherwise skipped from the program content before the content is delivered from delivery buffer 240 to the audio/video decoder 233. Steps 418 through 440 may repeat as multiple segments of commercial content are encountered in broadcast content.

As also illustrated in FIG. 4, the presentation rate initially established at step 410 may be modified to account for any pause, rewind, stop, or other form of interruption in the viewing of the television program by the user. Thus, at step 450, and while the television program is being delivered to the user, the television receiver 200 detects any pauses in the viewing of the television program, such as when the user makes a selection at the user interface to temporarily pause the program. When a pause is detected at step 450, the presentation rate is re-calculated at step 460. When play is to resume, the amount of programming content available, in relation to the remaining amount of broadcast content to be received, may be calculated. The longer paused, the more the presentation rate will approach the broadcast rate. In some embodiments, the re-calculation of the presentation rate may be done at the television service provider system, and sent (either over a network or through a television service provider network) to the television receiver 200. In other embodiments, the re-calculation of the presentation rate is done at the television receiver 200 and stored directly by the television receiver.

In the preceding description relating to FIG. 4, some steps have been described as being performed at only one television service provider system or the television receiver 200. However, it should be appreciated that various steps in the process could be performed at either (or both) the television service provider system and/or the television receiver 200. As examples only, while described earlier as being performed at the television service provider system, in various embodiments, step 410 (analyzing and calculating the initial presentation rate) and step 430 (tagging commercials) could be performed at the television receiver 200 rather than a television service provider system. Additionally, steps described above as being performed at the television receiver 200 (e.g., steps 418, 430, 432, 434, and/or 440) could be performed at the television service provider system, such that, for example, in some embodiments content already buffered (and having commercials removed) could be delivered to the television receiver for near real-time viewing by the user.

Also, while a method for tagging commercials involving human interaction was mentioned earlier, other methods could be employed. As examples, the tagging could be done at either the television service provider system or the television receiver 200 using various techniques, such as examining changes in audio volume or audio frequency that may represent transitions from actual program content to commercials, comparing frames (including video and/or audio) in the broadcast program content with frames or frame characteristics from known commercials (e.g., stored in a database) to detect matches to those known commercials, and so forth. In some embodiments, statistical analysis, fuzzy logic or neural networks could be employed to determine the likelihood of video and/or audio data indicating the start or end of a commercial.

Figure 5:
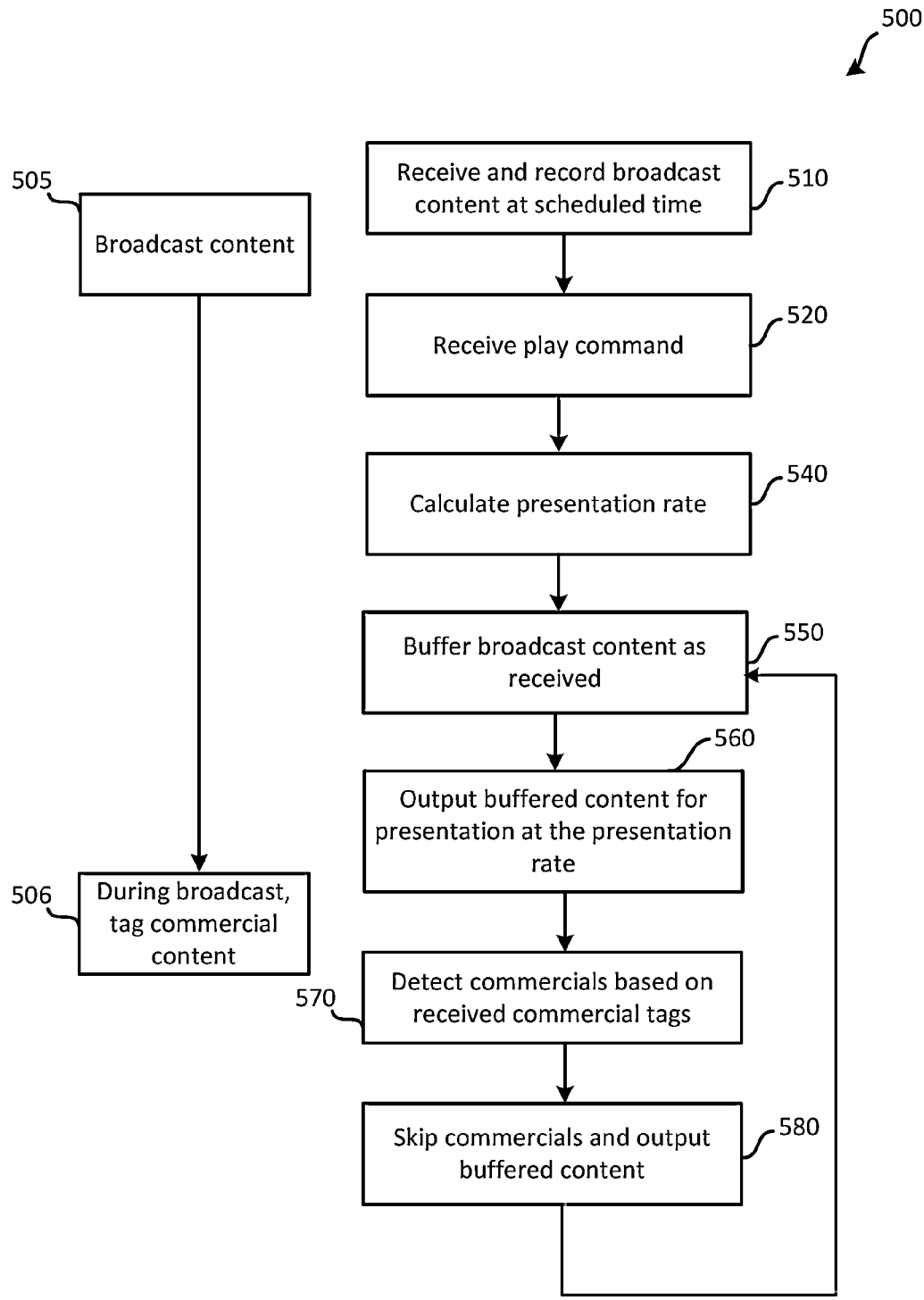
FIG. 5 illustrates an embodiment of a method for skipping portions of delivered content in which playback began after the content had been buffered for a period of time.

FIG. 5 illustrates an embodiment of a method 500 for skipping portions of delivered content in which playback began after the content has been buffered for a period of time. For example, referring to embodiment 100D of FIG. 1, broadcast content is received and stored. While the broadcast content is still being received, the user requests playback. The presentation rate is set such that the commercial content can be skipped. The presentation rate may be set as close to the broadcast rate as possible without requiring viewing of commercial content. Each step of method 500 may be performed by a television receiver, such as television receiver 200 of FIG. 2. Further, television receiver 200 may be computerized. As such, one or more components of computer system 600 of FIG. 6 may be used in performing method 500. Presentation of the content may end at substantially the same time as when the broadcast content ends being broadcast.

At step 505, the television service provider may broadcast the broadcast content containing the programming content and the commercial content. At step 510, the broadcast content may be received by the television receiver at the scheduled time. For example, for a 30 minute television program, the scheduled time may be from 8 to 8:30 PM, including one or more commercials and/or one or more commercial breaks. Based on a predefined timer, the broadcast content may be stored using DVR functionality of the television receiver. The predefined timer may have been set by a user of the television receiver or may have been received from the television service provider. In some embodiments, the television service provider may set timers at the television receiver that cause multiple television channels to be recorded over a same period of time via a single tuner. For instance, ABC, CBS, FOX, and NBC may be recorded on a nightly basis from 7-10 PM. Such recording may be accomplished via a single tuner of the television receiver.

At step 520, a play command may be received. This play command is received while some of the broadcast content is still being received via the broadcast by the television service provider. For example, referring to embodiment 100D of FIG. 1, if the broadcast content is being received over a period of 30 minutes, the play command may be received after the broadcast content has been received and stored for five minutes. Of course, the play command could be received earlier or later into the reception of the broadcast content. The play command may be based on user input, such as user input provided via a remote control. In some embodiments, a user may predefine a minimum desired presentation rate. After enough of the broadcast content has been received such that commercial content can be skipped while maintaining at least the minimum presentation rate, playback may be triggered to begin, or be indicated as eligible to begin. A visual indicator (e.g., text) may be output for presentation an indication of the currently available presentation rate and an option to begin playback with commercial content skipped.

At step 540, the presentation rate may be calculated by the television receiver. The calculation of the presentation rate may be in accordance with equation 1 or some variation. The time of programming content available to be presented includes programming content expected to be received during the remainder of the broadcast content and also programming content already recorded from the broadcast content at step 510. The time of the broadcast content would be in reference to the time amount of broadcast content yet to be received. For example, referring to embodiment 100D of FIG. 1, at time 160, 25 minutes of broadcast content are remaining to be broadcast (which may be determined using an EPG of the television receiver). At time 160, 3 minutes of programming content have already been recorded and 19 minutes of programming content have yet to be broadcast as part of the broadcast content, for a total of 22 minutes. Therefore, according to equation 1, the presentation rate would be 88% of the broadcast rate.

In some embodiments, if the above calculation exceeds 100%, the programming content may be played at an accelerated rate, faster than the broadcast rate such that playback will end at approximately the same time the broadcast is scheduled to end (e.g., at 8:30 PM if the broadcast content was scheduled from 8-8:30 PM). In other embodiments, the presentation rate may reach a maximum speed of 100% of the broadcast rate, thus in some instances causing playback to extend beyond when the broadcast is scheduled to end. As an example of this, returning to embodiment 100D of FIG. 1, if time 160, when a play command was received, was 12 minutes into the broadcast content rather than 5 minutes, equation 1 would yield a presentation rate of 122% (22 minutes of programming content divided by 18 minutes of remaining broadcast content). In such embodiments, the commercial content may be skipped while allowing playback to occur at the broadcast rate. In such instances, playback would extend beyond the time when broadcast content completes being received (e.g., at the end of the 30 minutes broadcast of the broadcast content). Such embodiments would permit viewing of the programming content with commercial content removed at the broadcast rate. Further such viewing would be occurring during a period of time overlapping the time period the broadcast content is being received.

Steps 550 through 580 may proceed similarly to steps 330 through 360 of method 300 of FIG. 3. At step 550, the broadcast content may be buffered as received by the television receiver, such as using delivery buffer 240 of FIG. 2. Broadcast content may be buffered to such a delivery buffer at the broadcast rate. This broadcast rate may reflect the rate at which the content was intended to be presented by the content provider. In other embodiments, only the programming content within the broadcast content may be buffered.

At step 560, programming content that has been buffered may be output at the calculated presentation rate. Prior to outputting the buffered programming content, the programming content recorded at step 510 from the broadcast content may be exhausted. The same presentation rate may be used for all of the presentation content. It should be understood that at least some of the broadcast content is being received (e.g., via a tuner) during a same time period when broadcast content is being buffered and output at the presentation rate for presentation. While broadcast content is being received, commercial content is tagged and broadcast by the television service provider at step 506.

At step 570, commercial content may be detected. In some embodiments, broadcast content is buffered, which would include the buffering of commercial content. In some embodiments, rather than buffering all of the broadcast content, only programming content is buffered. In various embodiments, the commercial content may be detected based on tags that indicate the start and end of commercial breaks and/or individual commercials of the commercial content. If broadcast content is received as a stream of packets, packets containing a special identifier that indicate metadata may be used to flag commercial content. Using such tags, commercial content may be excluded from being buffered at step 550 or output from presentation at step 580. In some embodiments, while a tuner may receive the broadcast content, a network interface may be used to retrieve tags from the television service provider. Regardless of whether commercial content is excluded at the buffering step or at the output step, the end result is that a television viewer does not view commercial content.

At step 580, commercial content is skipped. While commercial content is being broadcast and received by the television receiver, rather than outputting the commercial content for presentation, the programming content that has been recorded or buffered but has not yet been output, which may be due to the decreased presentation rate, may be output for presentation. Therefore, a television viewer can be viewing programming content while commercial content is being broadcast and received. While buffered programming content is being output from the buffer, the broadcast content, as broadcast, may again include programming content. Such programming content is buffered and output at a calculated presentation rate, thus allowing segments of presentation content to be output consecutively without any intervening commercial content.

The process of method 500 may be repeated as necessary such that multiple instances of commercial content within a piece of broadcast content are skipped. The presentation rate may be varied during output of the programming content based on a ratio of programming content to commercial content. It should be understood that methods 300, 400, and 500 may be combined in various alternate arrangements. For example, method 500 may include elements of method 400 such that a presentation rate is recalculated following a pause in playback.

Figure 6:
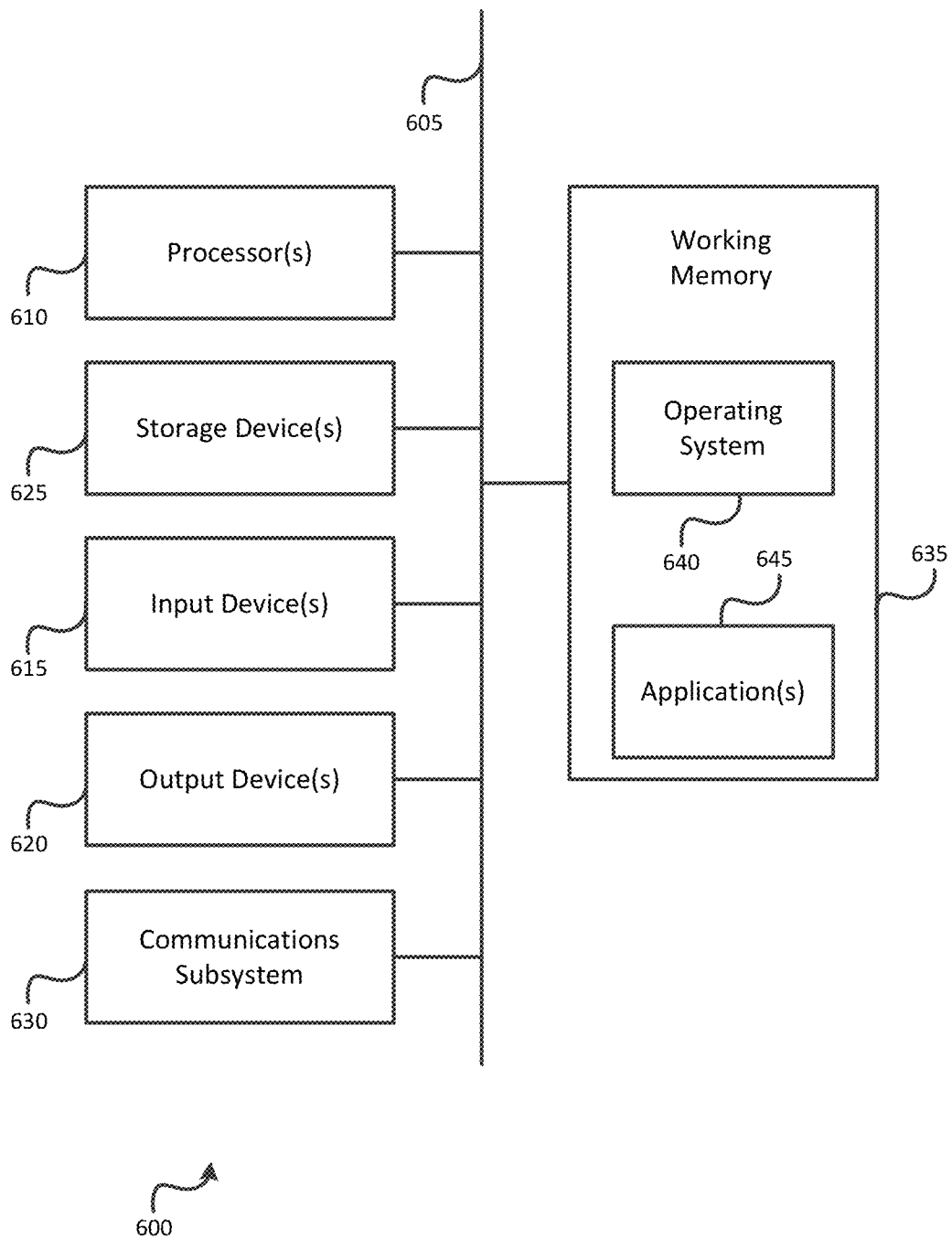
FIG. 6 illustrates an embodiment of a computer system.

A computer system 600 as illustrated in FIG. 6 may be incorporated as part of various computerized devices described herein. For example, computer system 600 can represent some of the components of the television receivers (e.g., set top boxes) discussed herein. Further, computer system 600 may be part of a television service provider system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 630 may permit data to be exchanged with a network (such as a network linking components of computer system 600, linking computer system 600 with other computer systems, and/or linking computer system 600 with any other devices described herein). In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above in connection with FIG. 3 might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A television receiver configured to output broadcast content for presentation with a segment of the broadcast content skipped, the television receiver comprising:
    a tuner configured to receive the broadcast content from a television service provider;
    a buffer configured to store at least a portion of the broadcast content, the broadcast content being created for presentation at a broadcast rate;
    one or more processors; and
    a non-transitory computer-readable storage medium communicatively coupled with and readable by the one or more processors and having stored therein processor-readable instructions which, when executed by the one or more processors, cause the one or more processors to:
        receive, via the tuner, the broadcast content, wherein the broadcast content comprises a first segment, a second segment, and a third segment;
        as the broadcast content is received, store the broadcast content to the buffer such that at least the first segment and the third segment are stored;
        identify the second segment of the broadcast content as the segment to be skipped from being output;
        calculate the presentation rate for outputting the first segment and the third segment based on a scheduled time period of the broadcast content and an expected length of commercial breaks within the broadcast content, wherein:
the expected length of commercial breaks within the broadcast content is determined by the television receiver based on a standardized model for television programs having a same duration as the broadcast content, the standardized model indicative of a duration of the broadcast content to be skipped from output;
the presentation rate is a single presentation rate used for outputting the first segment and the third segment; and
the presentation rate is a slower rate than the broadcast rate; and
consecutively output, to a presentation device, the first segment and the third segment at the presentation rate.

2. The television receiver configured to output the broadcast content for presentation with the segment of the broadcast content removed of claim 1, wherein the broadcast content comprises a television program having a commercial break, and the second segment comprises the commercial break.

3. The television receiver configured to output the broadcast content for presentation with the segment of the broadcast content removed of claim 1, wherein the processor-readable instructions, when executed, further cause the one or more processors to:
receive a pause command;
following the pause command, receive a play command; and
in response to the play command, calculate a second presentation rate for outputting the third segment, wherein the second presentation rate is greater than the presentation rate.

4. The television receiver configured to output the broadcast content for presentation with the segment of the broadcast content removed of claim 1, wherein the processor-readable instructions that, when executed, cause the one or more processors to identify the second segment of the broadcast content as the segment to be skipped from being output are based on one or more tags received via the tuner from the television service provider.

5. The television receiver configured to output the broadcast content for presentation with the segment of the broadcast content removed of claim 1, wherein the processor-readable instructions that, when executed, cause the one or more processors to identify the second segment of the broadcast content as the segment to be skipped from being output comprise processor-readable instructions which, when executed, cause the one or more processors to identify a start or an end of the second segment based on a presence of a string of characters in closed captioning data of the broadcast content.

6. The television receiver configured to output the broadcast content for presentation with the segment of the broadcast content removed of claim 1, wherein the standardized model used by the television receiver is created based on one or more previous episodes of the broadcast content.

7. A method for outputting broadcast content for presentation with a segment of the broadcast content skipped, the method comprising:
receiving, by a television receiver, the broadcast content, wherein:
the broadcast content comprises a first segment, a second segment, and a third segment; and
the broadcast content being created for presentation at a broadcast rate;
as the broadcast content is received, storing, by the television receiver, the broadcast content such that at least the first segment and the third segment are stored;
identifying, by the television receiver, the second segment of the broadcast content as the segment to be skipped from being output;
calculating the presentation rate for outputting the first segment and the third segment based on a scheduled time period of the broadcast content and an expected length of commercial breaks within the broadcast content, wherein:
the expected length of commercial breaks within the broadcast content is determined by the television receiver based on a standardized model for television programs having a same duration as the broadcast content, the standardized model indicative of a duration of the broadcast content to be skipped during output;
the presentation rate is a single presentation rate used for outputting the first segment and the third segment; and
the presentation rate is a slower rate than the broadcast rate; and
consecutively outputting, by the television receiver to a presentation device, the first segment and the third segment at the presentation rate.

8. The method for outputting the broadcast content for presentation with the segment of the broadcast content removed of claim 7, wherein the broadcast content comprises a television program having a commercial break, and the second segment comprises the commercial break.

9. The method for outputting the broadcast content for presentation with the segment of the broadcast content removed of claim 7, the method further comprising:
receiving, by the television receiver, a pause command;
following the pause command, receiving, by the television receiver, a play command; and
in response to the play command, calculating, by the television receiver, a second presentation rate for outputting the third segment, wherein the second presentation rate is greater than the presentation rate.

10. The method for outputting the broadcast content for presentation with the segment of the broadcast content removed of claim 7, wherein identifying the second segment of the broadcast content as the segment to be skipped from being output is based on one or more tags received via a tuner from a television service provider.

11. The method for outputting the broadcast content for presentation with the segment of the broadcast content removed of claim 7, wherein identifying the second segment of the broadcast content as the segment to be skipped from being output comprises identifying a start of the second segment based on a presence of a string of characters in closed captioning data of the broadcast content.

12. The method for outputting the broadcast content for presentation with the segment of the broadcast content removed of claim 7, wherein the standardized model used by the television receiver is created based on one or more previous episodes of the broadcast content.

13. A non-transitory processor-readable medium for outputting broadcast content for presentation with a segment of the broadcast content skipped comprising processor-readable instructions configured to cause one or more processors to:
receive, via a tuner, the broadcast content, wherein:
the broadcast content comprises a first segment, a second segment, and a third segment; and
the broadcast content being created for presentation at a broadcast rate;

as the broadcast content is received, store the broadcast content to a buffer such that at least the first segment and the third segment are stored;

identify the second segment of the broadcast content as the segment to be skipped from being output;

calculate the presentation rate for outputting the first segment and the third segment based on a scheduled time period of the broadcast content and an expected length of commercial breaks within the broadcast content, wherein:

the expected length of commercial breaks within the broadcast content is calculated by the television receiver based on historical information about commercial breaks obtained from historical broadcasts;

the presentation rate is a single presentation rate used for outputting the first segment and the third segment; and the presentation rate is a slower rate than the broadcast rate;

consecutively output, to a presentation device, the first segment and the third segment at the presentation rate.

14. The non-transitory processor-readable medium for outputting the broadcast content for presentation with the segment of the broadcast content removed of claim 13, wherein the broadcast content comprises a television program having a commercial break, and the second segment comprises the commercial break.

15. The non-transitory processor-readable medium for outputting the broadcast content for presentation with the segment of the broadcast content removed of claim 13, wherein the processor-readable instructions are further configured to cause the one or more processors to:

receive a pause command;

following the pause command, receive a play command; and in response to the play command, calculate a second presentation rate for outputting the third segment, wherein the second presentation rate is greater than the presentation rate.

16. The non-transitory processor-readable medium for outputting the broadcast content for presentation with the segment of the broadcast content removed of claim 13, wherein the processor-readable instructions that, when executed, cause the one or more processors to identify the second segment of the broadcast content as the segment to be skipped from being output comprise processor-readable instructions which, when executed, cause the one or more processors to identify an end of the second segment based on a presence of a string of characters in closed captioning data of the broadcast content.

* * * * *